United States Patent Office 2,761,871
Patented Sept. 4, 1956

2,761,871

REFINING HYDROGENATION OF PARAFFINS

Robert Lüben, Oberhausen, Germany, assignor to Ruhrchemie Aktiengesellschaft, Oberhausen-Holten, Germany, a corporation of Germany No Drawing. Application December 30, 1953,
Serial No. 401,395

Claims priority, application Germany January 15, 1953

8 Claims. (Cl. 260—450)

This invention relates to improvements in the refining hydrogenation of paraffins.

It is known to refine paraffins, such as hard waxes, and particularly those formed by the catalytic hydrogenation of carbon monoxide, which have a boiling point above 380° C. The refining is effected by hydrogenating these paraffins with the use of suitable catalysts, and preferably those which contain metals of the 8th group of the periodic system, and copper in addition to activators such as MgO. This hydrogenation is effected to produce colorless stable paraffins. The hydrogenation process is generally effected in continuous operation over fixed bed catalysts at temperatures of 200–260° C., and preferably at 250° C., using pressures of 10–120, and preferably 75 atmospheres. The termination of the hydrogenation is reached in 1–4 hours, and preferably in 2 hours.

In some cases, however, even with the use of high pressures, of, for example, 120 atmospheres, during the hydrogenation, it is not possible to obtain colorless, stable paraffins. The products obtained are colored, have little transparency, and assume additional undesirable color during further processing.

One object of this invention is to overcome the abovementioned disadvantage in the refining hydrogenation of paraffins. This, and still further objects will become apparent from the following description:

It has now been found in accordance with the invention that paraffins, and particularly hard waxes from the catalytic hydrogenation of carbon monoxide, may be converted into transparent, colorless, stable products by hydrogenation, if, prior to the hydrogenation, the paraffins are subjected to a pretreatment with water.

It is possible by means of the process in accordance with the invention to treat sulfur-free paraffins of any source. Synthetic paraffins and especially the so-called hard paraffin produced by way of the catalytic carbon monoxide hydrogenation may be processed with particular advantage. The boiling point of the paraffins to be treated in accordance with the invention ranges above 320° C. Their solidification point ranges between 35 and 120° C. Hard paraffins which have been produced by the catalytic carbon monoxide hydrogenation are residues from a vacuum distillation having initial boiling points of 320–600° C., pour points of 85–120° C., and penetration numbers (ASTM) of 6–0.0.

The pretreatment with water in accordance with the invention is generally effected for about 1–3 hours, preferably in an autoclave provided with a stirrer, at a temperature somewhat in excess of the solidification point of the paraffin and rising to as high as 200° C. The water must be present in the liquid phase during the pretreatment. Thus, the treatment with water is effected under a pressure which is at least as high as the water vapor pressure at the treating temperature, it being preferable to work at a somewhat higher pressure. Normal atmospheric pressure may be used when operating at a temperature of below 100° C. With treating temperatures of 200° C., the water vapor pressure must be at least 17.5 kg./sq. cm. There is no upper limit to the pressure. Depending on the starting material, from 1 to 10 parts by weight of paraffin may be treated with one part by weight of water.

In the pretreatment with water, the troublesome constituents are dissolved out by the water. The water and any thin emulsion layer formed during the pretreatment are separated from the starting product, and the latter is hydrogenated. The hydrogenation is effected at a temperature of 120–260° C., and preferably at 250° C. Pure hydrogen or a hydrogen-nitrogen mixture or mixtures of hydrogen and other inert gases may be used as the hydrogenating gas. The hydrogenation is effected under pressures of 10–120 atmospheres. The hydrogen partial pressure should amount to at least 10–100 atmospheres. A nitrogen-hydrogen mixture with a pressure of 75 atmospheres is preferably used for the hydrogenation with the nitrogen content being so proportioned as to have a hydrogen partial pressure of 56 atmospheres.

Catalysts which contain nickel, magnesia and kieselguhr, or the catalysts which are suitable for the catalytic carbon monoxide hydrogenation may be used as hydrogenation catalysts. It is also possible to use a catalyst which, for example, contains 100 parts by weight of nickel, 100 parts by weight of copper, 30 parts by weight of magnesia and 200 parts by weight of kieselguhr. Also, a catalyst consisting of 100 parts by weight of nickel, 15 parts by weight of magnesia, 2.5 parts by weight of thorium oxide and 50 parts by weight of kieselguhr is suited for hydrogenating the paraffins pretreated in accordance with the invention. The hydrogenation may generally be terminated within 15–180 minutes.

The following example is given by way of illustration and not limitation:

Example

A brown Fischer-Tropsch hard wax from the second synthesis stage, having a boiling point above 460° C. was hydrogenated for 5 hours at 250° C. and a $H_2+N_2$ pressure of 75 atmospheres, corresponding to a $H_2$ pressure of 56 atmospheres, over a nickel-magnesia-kieselguhr catalyst. Although the product was brightened, it remained little transparent, and appeared brown by transmitted light.

The same product was treated for 2 hours in a stirring autoclave with 30% water at 200° C. and a partial pressure of water vapor of about 16 atmospheres. After the separation of the water, the product was hydrogenated for two hours with the other conditions being the same, resulting in a transparent, colorless, stable hard wax.

I claim:

1. A process for refining sulfur-free paraffins obtained from the catalytic hydrogenation of carbon monoxide, which comprises contacting for about 1–3 hours such a paraffin having a melting point in excess of 35° C. and a boiling point in excess of 320° C. with water in the liquid phase at a temperature in excess of the melting point of said paraffin, said contacting being effected in a proportion of from 1 to 10 parts by weight of paraffin per part by weight of water, thereafter separating the water from the paraffin, hydrogenating the paraffin with hydrogen in the presence of a hydrogenation catalyst for about 1–4 hours at a temperature of from 120–260° C. and a pressure of 10–120 atmospheres and recovering a transparent, colorless stable paraffin.

2. A process in accordance with claim 1, in which the paraffin has a melting point of between 35 and 120° C.

3. A process in accordance with claim 1, in which said contacting is effected at a temperature of about 200° C.

4. A process in accordance with claim 1, in which said hydrogenation is carried out at a temperature of about 250° C.

5. A process in accordance with claim 1, in which said hydrogenation catalyst is a metal of the 8th group of the periodic system.

6. A process in accordance with claim 1, in which said hydrogenation is effected with a nitrogen-hydrogen mixture at a pressure of 75 atmospheres.

7. A process in accordance with claim 6, in which said hydrogenation is effected for about 2 hours.

8. A process in accordance with claim 7, in which the hydrogen of said nitrogen-hydrogen mixture has a partial pressure of 56 atmospheres.

References Cited in the file of this patent
UNITED STATES PATENTS

| | | |
|---|---|---|
| 1,684,640 | Schmidt et al. | Sept. 18, 1928 |
| 2,298,791 | Harrington et al. | Oct. 13, 1942 |
| 2,651,655 | Loughran | Sept. 8, 1953 |